United States Patent
Farr

[11] 4,005,759
[45] Feb. 1, 1977

[54] SOLENOID-OPERATED VALVE

[75] Inventor: Glyn Phillip Reginald Farr, Leek Wootton, England

[73] Assignee: Lucas Industries Limited, Birmingham, England

[22] Filed: Sept. 19, 1975

[21] Appl. No.: 615,127

[30] Foreign Application Priority Data

Oct. 11, 1974 United Kingdom ............ 44114/74

[52] U.S. Cl. .............................. 180/65 R; 188/156; 303/3
[51] Int. Cl.² ..................... B60T 13/00; B60K 1/00
[58] Field of Search ............ 180/65 R, 65 C, 65 D, 180/65 B; 188/156, 159; 303/3, 15; 318/371, 139

[56] References Cited
UNITED STATES PATENTS

| | | | |
|---|---|---|---|
| 1,805,630 | 5/1931 | McCune | 303/3 |
| 1,850,609 | 3/1932 | Thomas | 188/156 |
| 2,038,174 | 4/1936 | Hewitt | 303/3 |
| 3,171,505 | 3/1965 | Imelmann | 180/65 R |
| 3,275,380 | 9/1966 | May | 303/3 |
| 3,621,929 | 11/1971 | Oberthur et al. | 303/3 |
| 3,778,115 | 12/1973 | Ryburn et al. | 303/3 |

Primary Examiner—M. H. Wood, Jr.
Assistant Examiner—David M. Mitchell
Attorney, Agent, or Firm—Scrivener Parker Scrivener and Clarke

[57] ABSTRACT

In a solenoid-operated hydraulic brake pressure regulating valve assembly, a solenoid-operated valve and a pressure responsive valve are located in parallel connection between an inlet and an outlet, the solenoid-operated valve being closed when regenerative braking is in operation but open at all other times to provide communication between the inlet and the outlet, and the pressure-responsive valve being normally open but being adapted to close to isolate the inlet from the outlet after the solenoid-operated valve has closed and only after the pressure at the inlet has attained a predetermined value.

6 Claims, 2 Drawing Figures

SOLENOID-OPERATED VALVE

This invention relates to a new or improved solenoid-operated hydraulic brake pressure regulating valve assembly for use in hydraulic braking systems of electrically driven vehicles.

In electrically driven vehicles provided with hydraulic braking systems it is advantageous to use the electric motor which normally provides the drive to one pair of wheels to give maximum possible vehicle retardation whenever the brakes are applied. This is known as regenerative braking and when affected the motor can act partially to re-charge the batteries, thereby increasing the mileage range. Unfortunately the regenerative braking effect disappears below substantially 10 m.p.h. and a sudden increase in pedal effort is then necessary to maintain the deceleration of the vehicle. This is undesirable.

According to our invention a solenoid-operated hydraulic brake pressure regulating valve assembly for use in hydraulic braking systems of electrically driven vehicles comprises a housing having an inlet for connection to an hydraulic master cylinder, an outlet for connection to brakes on wheels driven by an electric motor adapted to provide regenerative braking, and a solenoid-operated valve and a pressure responsive valve located in parallel connection between the inlet and outlet, and solenoid-operated valve being closed when regenerative braking is in operation but open at all other times to provide communication between the inlet and the outlet, and the pressure-responsive valve being normally open but being adapted to close to isolate the inlet from the outlet after the solenoid-operated valve has closed and only after the pressure at the inlet has attained a predetermined value.

Since the solenoid-operated valve is open at all times when the regenerative braking is not in operation, for example when the regenerative braking disappears below substantially 10 m.p.h., the solenoid-operated valve places the outlet in direct communication with the inlet so that the hydraulically operated brakes are applied automatically and the vehicle maintains its deceleration without any increase in pedal effort at the master cylinder.

Conveniently the pressure-responsive valve is constructed and arranged to remain open until a point is reached at which the pressure at the outlet is sufficient to take up the braking clearances so that the pads engage the disc in a disc brake or the shoes engage the drum in a drum brake whereafter the pressure-responsive valve closes to prevent the brakes being applied hydraulically thereby holding off a pressure equivalent to the torque generated whilst the regenerative braking is in operation.

Preferably the pressure at the inlet acts on one end of a piston working in a bore in the housing and when both valves are closed the opposite end of the piston is exposed only to pressure at the outlet, and a pre-loaded spring urges the piston into a retracted position in opposition to the pressure at the inlet, the piston moving away from the retracted positon in a direction to pressurise hydraulic fluid in the bore and apply the brakes when the inlet pressure exceeds the outlet pressure by a predetermined amount sufficient to overcome the loading of the pre-loaded spring.

When the valve assembly is installed in a vehicle, electrical control means are actuated simultaneously with operation of a pedal operated hydraulic master cylinder to cause the electric motor to act as a generator for the batteries which normally power it and to energise the solenoid so that the solenoid-operated valve closes and the braking clearances of the brakes on the wheels driven by the electric motor are taken up.

Conveniently the master cylinder is of tandem or dual construction so that the driven pair of wheels and the freely rotatable pair of wheels are applied from different pressure spaces.

One embodiment of our invention is illustrated in the accompanying drawings in which.

Figure 1:
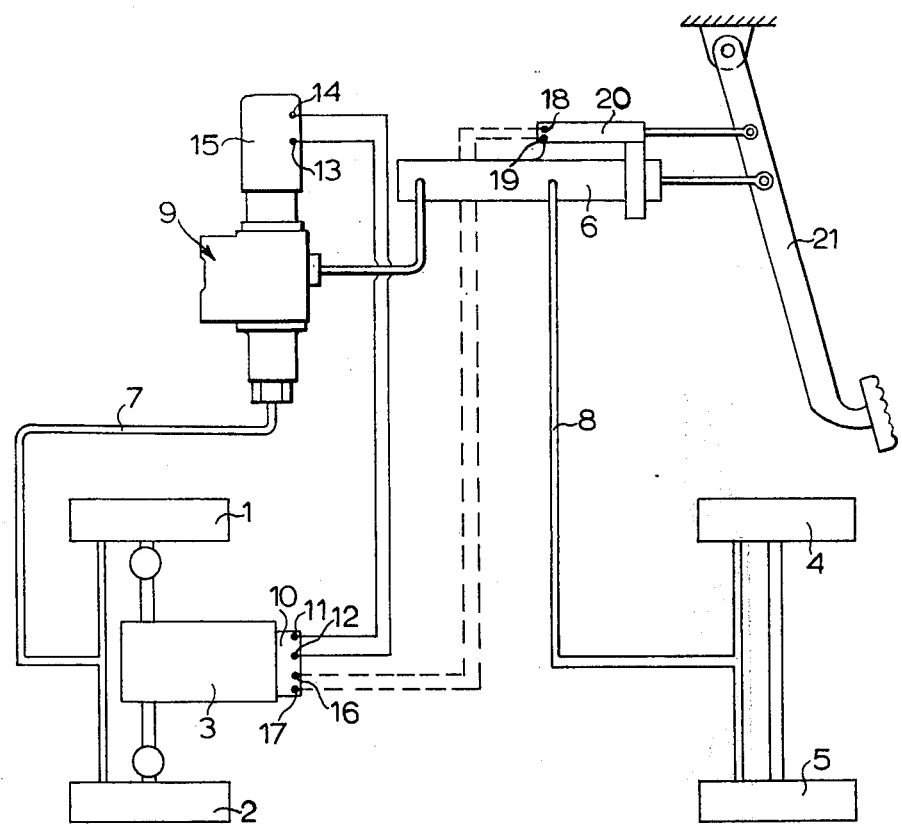
FIG. 1 is a layout of a braking system for an electrically driven vehicle.

In the braking system illustrated in FIG. 1 of the drawings of a pair of front wheels 1,2 of a vehicle are adapted to be driven by an electric motor 3 powered by an electrical battery pack (not shown), and a pair of rear wheels 4,5 are freely rotatable.

Figure 2:
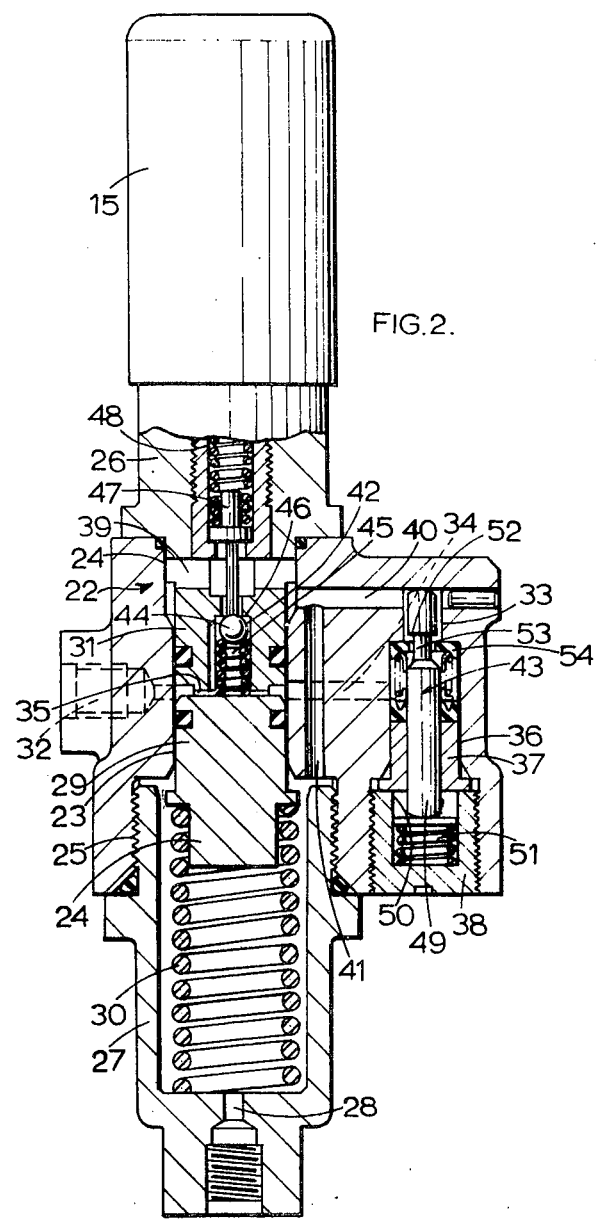
FIG. 2 is a longitudinal section through a solenoid-operated hydraulic pressure regulating valve assembly incorporated in the braking system of FIG. 1.

A pedal-operated tandem master cylinder 6 is provided with separate pressure spaces for applying hydraulically brakes on the front wheels 1,2 and the rear wheels 4,5 through pipe-lines 7 and 8 respectively with a solenoid-operated hydraulic pressure regulating valve assembly 9 (FIG. 2) located in the pipe-line 7.

Operation of the electric motor 3 is controlled by a control box 10 having terminals 11 and 12 connected to terminals 13 and 14 of the solenoid 15 of the valve assembly 9, and terminals 16 and 17 for connection to terminals 18 and 19 of a potentiometer 20 adapted to be operated simultaneously with operation of the master cylinder 6 by its pedal 21.

The valve assembly 9 comprises a housing 22 having a first through bore 23 which is counterbored at both ends 24 and 25 to receive respectively the inner end of the casing 26 containing the solenoid 15 and the screw-threaded inner end of a hollow elongate cup-shaped end closure 27 provided in its outer end with an outlet port 28 for connection to the brakes on the wheels 1 and 2.

A piston 29 working in the bore 23 projects into the interior of the end closure 27. The piston 29 is urged inwardly by a pre-loaded spring 30 and normally engages with the inner end of a valve guide 31 which projects into the bore from the counterbore 24 and is held in position by the casing 26.

A radial inlet port 32 connected to the master cylinder 6 communicates with a second bore 33 in the housing 22 through a first transverse passage 34 continuous with a diametral slot 35 in the inner end of the guide 31 and a counterbore 36 closed at its opposite end by a plug 37 which is clamped in position by a threaded retainer 38. The free end of the bore 33 communicates with a diametral passage 39 in the end of the guide 31 adjacent to the solenoid 15 through a second transverse passage 40 parallel with the first passage 34, and the transverse passage 40 is connected at all times to the interior of the end closure 27 and in consequence the outlet port 28, through an axial passage 41.

Communication between the inlet port 32 and the outlet port 28 is controlled by a valve 42 operated by the solenoid 15 and a limiter valve 43 in parallel connection with the solenoid-operated valve 42.

The valve 42 comprises a valve member 44 adapted to be urged by a spring 45 into engagement with a seating 46 in the guide 31. The valve member 44 is normally urged away from its seating by a spring-loaded push-rod 47 coupled to the core piece 48 of the solenoid 15 but allowed to close when the solenoid is energised.

The limiter valve 43 comprises a piston 49 working in a bore 50 in the plug 37 and normally urged by a spring 51 into engagement at its opposite end with a stop defined by the wall of the passage 40. In that position a valve head 52 defined by a shoulder at one end of a portion 53 of reduced diameter and disposed within the bore 33 is spaced from a seating member 54 at a step in the change in diameter between the bore 33 and the counterbore 36. There is a clearance between the head 52 and the bore 33 so that the bore 33 and the counterbore 36 are in communication when the head 52 is spaced from the seating 54, and there is a restricted passage between the seating 54 and the portion 53 of reduced diameter which projects through it.

When the pedal 21 is operated, the potentiometer 20 is operated to supply a voltage to the control box 10 to cause it to act as a generator for the battery pack. This applies a braking torque to the axle of the driven front wheels 1,2. At the same time the solenoid 15 is energised so that the valve member 44 engages with the seating 46 to isolate the passage 35 from the passage 39. The brakes on the rear wheels 4 and 5 are operated directly from the master cylinder 6 to take up the braking clearances (in a disc brake including friction pads and a rotatable disc the braking clearance is the distance between the pads and the disc). Fluid from and fluid from the other pressure space of the master cylinder supplied to the inlet port 32 passes to the outlet port 28 through then open limiting valve 43. This takes up the braking clearances of the brakes on the wheels 1 and 2 at which point the pressure in the counterbore 36 acting on the shoulder on the piston 49 at the end of the portion 53 remote from the head 52 is sufficient to urge the piston 49 against the loading in the spring 51 into engagement with the seating 54 to cut-off communication between the inlet port 32 and the outlet port 28.

When the speed of the vehicle falls below the figure at which the regenerative braking is affected the solenoid is de-energised so that the solenoid-operated valve 42 opens under the influence of the spring-loaded push-rod 47. This places the inlet port 32 in direct communication with the outlet port 28 through the passages 40 and 41. As the difference in pressure between that of the inlet port 32 and that of the outlet port 28 can be arranged to provide the same axle torque as the regenerative braking, then the deceleration of the vehicle remains the same without any increase in the effort applied to the pedal 21.

When the solenoid-operated valve 42 opens, a slight increase in pedal travel may be felt by the driver. This is caused by the expansion of the brakes as the difference in the pressures at the inlet port 32 and the outlet port 28 is applied. This is very small as the normal regenerative torque is substantially 0.1g and the corresponding difference in pressure is substantially 150 p.s.i.

If the brakes are applied at vehicle speeds below 10 m.p.h. the brakes are applied normally with an unrestricted fluid flow through the valve assembly 9.

Should the regenerative braking fail at any time, then the system will operate as a normal hydraulic braking system.

When a vehicle deceleration greater than that provided by the regenerative braking is required, closure of the solenoid-operated valve 42 is followed closely by closure of the limiting valve 43. Thereafter the master cylinder pressure, which is applied to the brakes on the wheels 4 and 5, is increased until the inlet pressure exceeds the outlet pressure by a predetermined amount sufficient to exceed the pre-load of the spring 30 and the piston 24 moves towards the outlet 28 to pressurise the trapped volume of fluid between the closed valves 42 and 43 and the actuators of the brakes 1 and 2 i.e. in the passage 41 and the bore between the outlet and the end of the piston 24. When the piston 24 pressurises the said trapped volume of fluid, the brake pressures applied to the brakes on both pairs of wheels rise at substantially the same rate.

I claim:

1. A solenoid-operated hydraulic brake pressure regulating valve assembly for use in an hydraulic braking system of an electrically driven vehicle comprising housing means having means defining an inlet for connection to an hydraulic master cylinder and means defining an outlet for connection to brakes on wheels driven by an electric motor adapted to provide regenerative braking, a solenoid-operated valve, and a pressure-responsive valve, said solenoid-operated valve and said pressure-responsive valve being located in said housing in parallel connection between said inlet and said outlet, means closing said solenoid-operated valve when regenerative braking is in operation and opening it at all other times to provide communication between said inlet and said outlet, said pressure-responsive valve incorporating pressure responsive means constructed and arranged to cause said pressure-responsive valve to remain open until a predetermined value of the pressure at said inlet is reached at which pressure the pressure at said outlet is sufficient to take up braking clearances whereafter said pressure-responsive valve closes to prevent said brakes being applied hydraulically thereby holding off a pressure equivalent to the torque generated whilst regenerative braking is in operation.

2. A solenoid-operated valve assembly as claimed in claim 1, wherein said housing means is also provided with a bore and a piston working in said bore and having first and second opposite ends is exposed at said first end to said inlet and, when both said solenoid-operated and said pressure responsive valves are closed, is exposed at said second end only to said outlet, and a pre-loaded spring normally urges said piston into a retracted position in opposition to pressure at said inlet, said piston moving away from said retracted position in a direction to pressurise fluid in a portion of said bore to which the said second end is exposed when pressure at said inlet exceeds pressure at said outlet by a predetermined amount sufficient to overcome the loading of said pre-loaded spring.

3. A solenoid-operated valve assembly as claimed in claim 1, wherein said solenoid-operated valve comprises a seating disposed between said inlet and said outlet, a valve member for engagement with said seating, a spring for urging said valve member into engagement with said seating, a solenoid having a core piece, a spring-loaded push-rod coupled to said core-piece for moving said valve member away from said seating in opposition to said spring, energisation of said solenoid causing said core piece and said push-rod to move away from said seating to permit said valve member to engage with the seating and close said valve in response to the loading of said spring.

4. A solenoid-operated valve assembly as claimed in claim 1, wherein said pressure responsive valve comprises a seating in communication on opposite sides with said inlet and said outlet, a piston working in a second bore in said housing means and having an intermediate piston portion of reduced diameter projecting through said seating, a shoulder at one end of said intermediate piston portion defining a valve head for engagement with said seating, a stop, a spring for urging said piston into a retracted position in engagement with said stop in which said valve head is spaced from said seating, and a second shoulder at the opposite end of said intermediate piston portion, exposed to said inlet to urge said piston in a direction in which said head engages with said seating to close said valve when pressure at said inlet has attained the said predetermined value which is sufficient to overcome the loading in said spring.

5. A vehicle braking system for an electrically driven vehicle having a pair of wheels driven by an electric motor, batteries for powering said motor, and a pair of freely rotatable wheels, the system comprising a pedal-operated master cylinder for applying brakes on both pairs of wheels, electrical control means adapted to be actuated simultaneously with operation of said pedal-operated master cylinder, and a solenoid-operated hydraulic pressure regulating valve for regulating the communication between said master cylinder and said brakes on said motor powered wheels, said solenoid-operated hydraulic pressure regulating valve comprising a housing having an inlet connected to said hydraulic master cylinder, and outlet connected to said brakes on said motor powered wheels, a solenoid-operated valve, and a pressure responsive valve, said solenoid-operated valve and said pressure responsive valve being located in said housing in parallel connection between said inlet and said outlet, said solenoid-operated valve including means closing said valve when regenerative braking is in operation and opening it at all other times to provide communication between said inlet and said outlet, said pressure-responsive valve incorporating pressure responsive means constructed and arranged to cause said pressure responsive valve to remain open until a predetermined value of the pressure at said inlet is reached whereafter said pressure-responsive valve closes to prevent said brakes being applied hydraulically thereby holding off a pressure equivalent to the torque generated whilst regenerative braking is in operation, and said electrical control means being adapted to cause said electric motor to act as a generator for said batteries and to energize said solenoid so that said solenoid-operated valve closes and braking clearances of brakes on said motor powered wheels are taken up.

6. A vehicle braking system as claimed in claim 5, wherein the master cylinder has a first pressure space for connection through said solenoid-operated valve to said brakes on said motor powered wheels and a second pressure space for connection to brakes on said freely rotatable wheels.

* * * * *